Patented Apr. 10, 1951

2,548,124

UNITED STATES PATENT OFFICE 2,548,124

MANUFACTURE OF GLUTAMIC ACID

Albert J. Schlaeger and Forest A. Hoglan, Toledo, Ohio, assignors to International Minerals & Chemical Corporation, a corporation of New York No Drawing. Application April 18, 1950,
Serial No. 156,732

23 Claims. (Cl. 260—527)

This invention relates to a new and improved process for the production of glutamic acid. More particularly this invention relates to a process for the recovery of glutamic acid from Steffen's filtrate.

Steffen's filtrate is a waste product produced from the desugarizing of sugar beet solutions and contains approximately 3% of dry matter which comprises organic and inorganic salts, small quantities of sugars, and nitrogenous organic compounds including glutamic acid and glutamic acid mother substances. Glutamic acid has previously been obtained from Steffen's filtrate by various procedures including hydrolysis with either acid or alkaline reagents. Frequently the recovery of glutamic acid has necessarily involved prior separation of betaine and inorganic salts, with subsequent hydrolysis, usually with mineral acids, and various other manipulative procedures to recover glutamic acid. Mineral acids such as sulfuric, hydrochloric and phosphoric have been used to hydrolyze Steffen's filtrate. Also alkaline reagents such as sodium hydroxide and calcium oxide have been employed. These methods suffer from numerous disadvantages among which can be mentioned the contamination of the glutamic acid with dark colored organic matter and also with inorganic salts. In order to purify the glutamic acid recovered when employing such processes it is necessary to repeatedly recrystallize the glutamic acid in order to eliminate inorganic salts, and also to employ various decolorizing agents such as activated charcoal in order to adequately remove dark colored organic matter and render the glutamic acid of sufficient purity for marketing. It has also been previously proposed to manufacture glutamic acid by concentrating a Steffen's filtrate hydrolysate up to a point at which inorganic salts and glutamic acid hydrochloride will crystallize. The pH of the concentrated hydrolysate is then adjusted to about 2.1 and inorganic salts are removed. The pH of the resultant solution is adjusted to about 3.2 and glutamic acid is recovered. It has been found that appreciable amounts of glutamic acid also crystallize from solution together with the inorganic salts at this pH value (2.1) and numerous and laborious recrystallization steps are required to recover only a portion of the glutamic acid from these salts. This loss of product with the inorganic salts seriously detracts from the commercial feasibility of the process. By employing the process herein described. the removal of inorganic salts and humin, which heretofore has been quite difficult, is readily accomplished, and a glutamic acid of high purity may be recovered. Furthermore, the yields of glutamic acid which are realized from Steffen's filtrate by the process which is the subject of this invention are substantially improved over those obtained by many of the prior procedures.

One object of the invention is to provide a new and improved process for the production and recovery of glutamic acid from Steffen's filtrate.

Another object of the invention is to provide a new and improved process whereby glutamic acid is recovered from Steffen's filtrate in higher yields than have heretofore been obtained.

Another object of the invention is to provide a new and improved process whereby glutamic acid is recovered from Steffen's filtrate in a high degree of purity.

The present invention involves the discovery that when Steffen's filtrate is hydrolyzed by means of acid or alkaline reagents, and the pH of the resultant hydrolysate is adjusted to about 1.6, certain objectionable impurities including inorganic salts and dark colored insoluble organic matter may be more advantageously removed from the hydrolysate than when removal of these materials is effected at pH values between about 2.1 and about 7.0, which has been the prior practice. Not only are these materials more completely removed at a pH of about 1.6, but the ease of removal is also greatly facilitated.

The novel process herein described is carried out by preparing either an acid or an alkaline hydrolysate of Steffen's filtrate, adjusting the pH of the hydrolysate to about 1.6 with alkaline or acid reagents or with an acid or an alkaline Steffen's filtrate hydrolysate resulting from the separately conducted acid or alkaline hydrolysis of Steffen's filtrate, separating salts from the adjusted hydrolysate or from the combined hydrolysates together with other insoluble material such as humin, and concentrating the resultant solution to a point where crystallization of salts occurs. The salts which precipitate are separated from the concentrated hydrolysates and the pH of the resultant solution is adjusted to about 3.2 by means of an alkaline reagent or an alkaline Steffen's filtrate hydrolysate. The solution is allowed to stand for several days in order to allow glutamic acid to crystallize therefrom.

More particularly, the process which is the subject of this invention is carried out by hydrolyzing Steffen's filtrate with a mineral acid, for example hydrochloric acid (about 36% HCl), at temperatures between about 100° C. and about 125° C. for a period of from about 0.25 to about 8 hours. The quantity of acid which is necessary to hydrolyze the Steffen's filtrate may be varied over a fairly wide range, for example from about 50 parts to about 150 parts of acid to 100 parts of Steffen's filtrate. Preferably about two or three parts of hydrochloric acid (35–37% HCl) to three parts of Steffen's filtrate is employed.

In an embodiment of the invention an acid hydrolysate prepared as described above is treated with an inorganic alkaline compound such as sodium hydroxide or ammonia until the pH of the hydrolysate is about 1.6. The hydrolysate is then filtered in order to remove insoluble dark colored organic matter, including humin, and also to remove salts which may separate from the adjusted hydrolysate. The clarified hydrolysate is concentrated at a temperature not greater than 100° C. to a point at which crystallization of salts occurs. The concentration is carried to a point whereby the weight of the adjusted hydrolysate is reduced to between about 75% and about 90% of the weight of the initial Steffen's filtrate, although the degree of concentration will depend upon the point at which incipient crystallization occurs. The concentrate is maintained at a temperature between about 30° and about 60° C. in order to achieve crystallization of salts. The salts are separated by filtration and the pH of the resultant solution is adjusted to about 3.2 with an alkaline reagent such as sodium hydroxide or ammonia. Glutamic acid is then crystallized therefrom. Since inorganic ammonium salts are, in general, more soluble in the concentrated liquor than are the corresponding sodium and potassium salts, the glutamic acid which subsequently crystallizes from the concentrated hydrolysate is less contaminated with inorganic salts when using ammonia than when alkaline reagents such as sodium hydroxide or potassium hydroxide are employed to adjust the pH of the acid hydrolysate to about 3.2. Alkaline hydrolyzed Steffen's filtrate can also be used to adjust the pH to about 3.2.

In another embodiment of the invention, an acid hydrolysate prepared as described above is filtered prior to a pH adjustment to about 1.6 in order to remove insoluble dark colored organic matter, including humin, as well as precipitated salts. The clarified acid hdrolysate is then treated with an alkaline reagent until the pH of the hydrolysate is about 1.6. The subsequent steps in the process are substantially the same as described in the previous paragraph, and the glutamic acid which is isolated is comparable both with respect to purity and yield.

The alkaline hydrolysis of Steffen's filtrate is achieved by heating Steffen's filtrate at temperatures not greater than 100° C., and preferably not above 85° C., with alkaline reagents such as sodium hydroxide and calcium hydroxide. The amount of alkaline reagent employed is usually not greater than 10%, and is preferably about 8.0%, based on the weight of Steffen's filtrate.

In a further embodiment of the invention, Steffen's filtrate is hydrolyzed with an alkaline reagent such as sodium hydroxide or calcium oxide at a temperature of about 85° C. for a period of about two hours. Preferably the amount of alkaline reagent employed in the case of sodium hydroxide is about 8.0% based on the weight of Steffen's filtrate. The alkaline hydrolysate is treated with a mineral acid such as hydrochloric acid and/or sulfuric acid until the pH of the hydrolysate is about 1.6. The hydrolysate may then be filtered in order to remove precipitated salts and any other insoluble material. The resultant solution is concentrated to a weight of between about 75% and about 90% of the weight of he initial Steffen's filtrate although the degree of concentration will depend upon the point at which incipient crystallization occurs. The concentrated hydrolysate is then maintained at a temperature between about 30° C. and about 60° C. in order to allow salts to crystallize, after which said salts are removed by filtration at a temperature between about 40° C. and about 60° C. The pH of the resultant solution is adjusted to about 3.2 and glutamic acid is recovered therefrom essentially as described in the case of an acid hydrolysate. Alternatively, the hydrolysate need not be filtered directly after adjustment to a pH of about 1.6, but may be concentrated directly, and the salts removed by a single filtration.

According to another method of the invention, the acid hydrolysate is filtered in order to remove humin, salts, and other insoluble matter. The resultant solution is then combined with alkaline hydrolysate to give a pH of about 1.6. If any salts or other insoluble matter precipitate at this point they may be removed by filtration. The combined hydrolysate is concentrated, preferably at a temperature not greater than 100° C., at least to the point of incipient crystallization of salts. Usually a concentration of between about 55% and about 90% of the initial weight of the Steffen's filtrate will be required, but the concentration may be carried to any desired point depending upon the point at which incipient crystallization occurs. The salts which crystallize are then separated from the solution, preferably at a temperature between about 40° C. and about 60° C., and the pH of the resultant filtrate is adjusted to about 3.2 which is the isoelectric point of glutamic acid. This adjustment may be accomplished with alkaline reagents such as sodium hydroxide, calcium oxide, ammonia, alkaline-hydrolyzed Steffen's filtrate, etc. The concentrates which have thus been adjusted to a pH of about 3.2 are allowed to remain at room temperature for several days during which time glutamic acid crystallizes from the solution. The glutamic acid is separated and may be either repulped with about one-half its weight of water, thereby raising the purity of the glutamic acid by removal of residual salts, or it may be dried and packaged as isolated.

A modification of the process described above comprises preparing an acid hydrolysate of Steffen's filtrate and combining it with an alkaline hydrolysate of Steffen's filtrate directly without first removing humin and other insoluble material from the acid hydrolysate. The hydrolysates may be combined as described above, preferably to give a pH of about 1.6 for the combined hydrolysates. Humin and other insoluble material are separated from the combined hydrolysates and the resultant solution is treated as described in the above paragraph.

It has been found that when Steffen's filtrate (specific gravity about 1.3) is hydrolyzed by about an equal weight of concentrated hydrochloric acid (about 37% HCl) and Steffen's filtrate is separately hydrolyzed with about 8.5% of sodium hydroxide, based on the weight of Steffen's filtrate, combining approximately equal amounts of the hydrolysates will give a pH of about 1.6 which is the preferable pH for the first filtration to remove humin, salts, and other insoluble material. Obviously the combining ratios of the hydrolysates will depend upon the amounts of acid and alkaline reagents employed in the hydrolysis of the Steffen's filtrate by either procedure, and upon the desired pH value to be attained in the combined hydrolysate.

In the past, either alkaline or acid hydrolysis of Steffen's filtrate must be followed by the addition of acid and alkaline reagents, respectively, in order to crystallize glutamic acid from the hydrolysate at an appropriate pH. When the process herein described is employed for the production of glutamic acid from Steffen's filtrate, the quantities of inorganic reagents required to produce an equal amount of glutamic acid are reduced by nearly fifty per cent. Also, the volumes of the hydrolysates are maintained at a minimum, which is important from an economic standpoint in that concentration of the hydrolysates constitutes one of the major processing costs in producing glutamic acid from Steffen's filtrate.

When the alkaline hydrolysis of Steffen's filtrate as described herein is employed for the production of glutamic acid, the yields of this acid are between 10% and 20% higher than the yields which are achieved by employing alkaline hydrolysis of Steffen's filtrate according to prior conventional procedures, wherein the filtration of the hydrolysate is conducted at a pH of about 5.0 with subsequent adjustment of the hydrolysate to a pH of about 3.2. In the case of acid hydrolysis, it has been found that when the pH of the acid hydrolysate is adjusted to about 1.6, as described in the instant novel process, as distinct from procedures previously described in the prior art, the inorganic salts which precipitate are more readily washed free of entrained glutamic acid values and the removal of said inorganic materials is more complete at this pH than at pH values of about 3.2 and higher. Also there is less tendency for the hydrolysate to foam during the concentration step than when the acid hydrolysate is concentrated at pH values between about 4.5 to about 5.5 as disclosed in the prior art.

In order to afford a more complete description of the invention, but with no intention of being limited thereby, the following examples are given:

Example I

About one kilogram of Steffen's filtrate (specific gravity about 1.32 at 24° C.) is heated under reflux conditions with about 650 g. of concentrated hydrochloric acid (about 36% HCl) for a period of about four hours. The hydrolysate is cooled to room temperature and filtered in order to remove insoluble dark colored organic matter, including humin. The filtrate is then treated with a sufficient amount of 50% sodium hydroxide solution in order to give a pH of about 1.6. The adjusted hydrolysate is then filtered, preferably through a suitable filter-aid such as "dicalite", in order to remove precipitated salts and residual insoluble organic matter. The resultant solution is then concentrated to about 90% of the weight of the original Steffen's filtrate. The concentrate is allowed to stand for several hours in order to crystallize salts and the said salts are separated by filtration at a temperature between about 40° C. and about 60° C. The pH of the resultant filtrate is adjusted to about 3.2 with ammonia and the adjusted solution is allowed to stand for several days in order to crystallize glutamic acid. The glutamic acid is separated and, if desired, may be repulped with about 60% by weight of water. The product is then dried and has a purity between about 90% and about 95%.

Example II

About one kilogram of Steffen's filtrate (specific gravity about 1.32 at 24° C.) is heated with about 650 g. of concentrated hydrochloric acid (about 36% HCl) under reflux conditions for a period of about four hours. To the resultant hydrolysate is added sufficient 50% sodium hydroxide solution to give a pH of about 1.6. The precipitated salts and insoluble dark colored organic matter, including humin, are removed by filtration, and the resultant clarified hydrolysate is concentrated to between about 70% and about 90% of the weight of the original Steffen's filtrate. The subsequent steps are substantially the same as described in Example I. The yield and purity of the product are similar to the values attained in Example I.

Example III

About 500 g. of Steffen's filtrate (specific gravity about 1.32 at 24° C.) is heated at a temperature of about 85° C., for about two hours with about 7.5% of sodium hydroxide, based on the weight of Steffen's filtrate. The pH of the resultant hydrolysate is adjusted to about 1.6 by the addition of the requisite amount of a mineral acid; for example, about 250 ml. of concentrated hydrochloric acid (about 36% HCl) will be required. The adjusted hydrolysate is then concentrated to the point of crystallization of salts, usually between about 80% and about 90% of the initial weight of the Steffen's filtrate, and the precipitated salts are removed by filtration, preferably at a temperature between about 40° C. and about 50° C. The pH of the resultant solution is adjusted to about 3.2 with ammonia and the adjusted solution is allowed to stand for several days in order to crystallize glutamic acid. The glutamic acid is recovered by filtration and, if desired, may be repulped with about 60% by weight of water.

The yield of dried product is about 3% lower than in the case of acid hydrolysis; however, the yield is between about 10% and about 20% higher than when glutamic acid is recovered from Steffen's filtrate according to procedures disclosed in the prior art wherein the filtration of salts and insoluble matter and concentration is conducted with hydrolysates having pH values between about 4.0 and about 5.0.

Example IV

About 500 g. of Steffen's filtrate (specific gravity about 1.32 at 24° C.) is hydrolyzed with an equal weight of hydrochloric acid (about 36% HCl) under reflux conditions for about four hours. After cooling to room temperature, the reaction mixture is filtered to remove humin and other insoluble matter including salts.

An alkaline hydrolysate of Steffen's filtrate is prepared by heating about 500 g. of Steffen's filtrate (specific gravity about 1.32 at 24° C.) with about 7.5% of sodium hydroxide, based on the weight of Steffen's filtrate, for about 2.25 hours at about 85° C.

The two hydrolysates are combined to give a pH of about 1.6, approximately equal weights of two hydrolysates being required. If any inorganic salts separate at this point they are removed by filtration. The solution is then evaporated, preferably under reduced pressure, to approximately 75% of the initial weight of the Steffen's filtrate employed in both hydrolysis procedures. The salts which precipitate from the concentrate are removed by filtration at a temperature between about 40° C. and about 60° C. The pH of the resultant solution is adjusted to about 3.2 with ammonia and the crystallization of glutamic acid is allowed to proceed for several days. The glutamic acid is separated by filtration and is repulped with about 60% of its weight of water. The product is then dried. It has a purity between about 93% and about 95%.

*Example V*

The acid hydrolysate is prepared as described in Example IV, and is combined without first removing humin with an alkaline hydrolysate (Example IV) to give a pH of about 1.6. Humin and other insoluble material including salts are removed from the combined hydrolysate by filtration, preferably through a suitable filter-aid such as "dicalite," and the resultant solution is concentrated to about 75% of the initial weight of the Steffen's filtrate employed in the two hydrolysis procedures. The solution is maintained at a temperature between about 30° C. and about 60° C. for about two hours and the precipitated salts are removed by filtration at a temperature between about 40° C. and about 50° C. The pH of the resultant solution is adjusted to about 3.2 with ammonia, and glutamic acid is allowed to crystallize from the solution at room temperature over a period of several days. The isolated glutamic acid may be repulped with approximately 60% by weight of water, after which the product is dried. The yield and purity of the resultant glutamic acid are similar to the results obtained in Example IV.

While the procedures described above employ hydrochloric acid and sodium hydroxide as the hydrolytic reagents it is understood that other mineral acids such as sulfuric acid, phosphoric acid, etc., and other alkaline reagents such as potassium hydroxide, calcium oxide, and calcium hydroxide, etc., may be used to achieve the hydrolysis of Steffen's filtrate, and such procedures are deemed to be within the scope of this invention. Furthermore, the examples describe the use of ammonia in adjusting the pH of the concentrated hydrolysates to about 3.2. It is understood that other alkaline reagents such as those just mentioned may also be used in this step of the process.

As used in the specification and claims, the term "glutamic acid" is intended to refer to the natural optical isomer variously known as d-glutamic acid, l(+) glutamic acid, and more recently as L-glutamic acid.

This application is a continuation of copending applications Serial No. 752,273 and Serial No. 752,274, both filed on June 3, 1947 and both now abandoned.

The invention is obviously not limited to the procedural details stated, but may be carried out by employing various extensions of the factors recited.

We claim:

1. The process which comprises hydrolyzing Steffen's filtrate, initially adjusting the pH of the hydrolysate to about 1.6, separating salts and insoluble material, adjusting the pH of the resultant solution to about 3.2 and recovering glutamic acid therefrom.

2. The process which comprises hydrolyzing Steffen's filtrate, initially adjusting the pH of the hydrolysate to about 1.6, concentrating the resultant solution to crystallize salts, separating said salts therefrom, adjusting the pH of the resultant solution to about 3.2 and recovering glutamic acid therefrom.

3. The process which comprises hydrolyzing Steffen's filtrate, initially adjusting the pH of the hydrolysate to about 1.6, separating insoluble material therefrom, concentrating the resultant solution to crystallize salts, separating said salts therefrom, adjusting the pH of the resultant solution to about 3.2 and recovering glutamic acid therefrom.

4. The process which comprises hydrolyzing Steffen's filtrate, separating insoluble material therefrom, initially adjusting the pH of the clarified hydrolysate to about 1.6, crystallizing and separating salts therefrom, concentrating the resultant solution to crystallize salts, separating said salts therefrom, adjusting the pH of the resultant solution to about 3.2 and recovering glutamic acid therefrom.

5. The process which comprises hydrolyzing Steffen's filtrate with a non-oxidizing mineral acid, initially adjusting the pH of the hydrolysate to about 1.6 with an alkaline compound, crystallizing and separating salts therefrom together with insoluble material, concentrating the resultant solution to crystallize salts, separating said salts therefrom, adjusting the pH of the resultant solution to about 3.2 and recovering glutamic acid therefrom.

6. The process which comprises hydrolyzing Steffen's filtrate with a non-oxidizing mineral acid, separating insoluble material from the hydrolysate, initially adjusting the pH of the clarified hydrolysate to about 1.6 with an alkaline compound, crystallizing and separating salts therefrom, concentrating the resultant solution to crystallize salts, separating said salts, adjusting the pH of the resultant solution to about 3.2 and recovering glutamic acid therefrom.

7. The process which comprises hydrolyzing Steffen's filtrate with hydrochloric acid, initially adjusting the pH of the hydrolysate to about 1.6 with sodium hydroxide, crystallizing and separating salts therefrom together with insoluble material, concentrating the resultant solution to crystallize salts, separating said salts therefrom, adjusting the pH of the resultant solution to about 3.2 with ammonia and recovering glutamic acid therefrom.

8. The process which comprises hydrolyzing about three parts of concentrated Steffen's filtrate with about two parts of concentrated hydrochloric acid (35–37% HCl) at a temperature between about 100° C. and about 125° C., initially adjusting the pH of the hydrolysate to about 1.6 with a solution of sodium hydroxide, crystallizing and separating salts therefrom together with insoluble material, concentrating the resultant solution to between about 75 and about 90% of the initial weight of the Steffen's filtrate, crystallizing and separating salts therefrom at a temperature between about 30° C. and about 60° C., adjusting the pH of the resultant solution to about 3.2 with ammonia and recovering glutamic acid therefrom.

9. The process which comprises hydrolyzing Steffen's filtrate with hydrochloric acid, separating insoluble material from the hydrolysate, adjusting the pH of the clarified hydrolysate to about 1.6 with sodium hydroxide, crystallizing and separating salts therefrom, concentrating the resultant solution to crystallize salts, separating said salts therefrom, adjusting the pH of the resultant solution to about 3.2 with ammonia and recovering glutamic acid therefrom.

10. The process which comprises hydrolyzing Steffen's filtrate with an inorganic alkaline compound, initially adjusting the pH of the hydrolysate to about 1.6 with a non-oxidizing mineral acid, crystallizing and separating salts therefrom together with insoluble material, concentrating the resultant solution to crystallize salts, separating said salts therefrom, adjusting the pH of the resultant solution to about 3.2 and recovering glutamic acid therefrom.

11. The process which comprises hydrolyzing Steffen's filtrate with an amount of sodium hydroxide not greater than 10.0% by weight based on the weight of Steffen's filtrate at a temperature of about 85° C. for a period of about two hours, initially adjusting the pH of the hydrolysate to about 1.6 with hydrochloric acid, crystallizing and separating salts therefrom together with insoluble material, concentrating the resultant solution to between about 75 and about 90% of the initial weight of the Steffen's filtrate, crystallizing and separating salts therefrom at a temperature between about 40° C. and about 60° C., adjusting the pH of the resultant solution to about 3.2 with ammonia and recovering glutamic acid therefrom.

12. A process which comprises separately preparing an acid hydrolysate of Steffen's filtrate and an alkaline hydrolysate of Steffen's filtrate, combining the two hydrolysates to give a controlled pH of about 1.6, concentrating the resultant solution to crystallize salts, separating said salts therefrom, adjusting the pH of the resultant solution to about 3.2, and recovering glutamic acid therefrom.

13. A process which comprises separately preparing an acid hydrolysate of Steffen's filtrate and an alkaline hydrolysate of Steffen's filtrate, separating humin from the acid hydrolysate, combining the two hydrolysates to give a controlled pH of about 1.6, concentrating the resultant combined hydrolysate to crystallize salts, separating said salts therefrom, adjusting the pH of the resultant solution to about 3.2, and recovering glutamic acid therefrom.

14. A process which comprises separately preparing an acid hydrolysate of Steffen's filtrate and an alkaline hydrolysate of Steffen's filtrate, combining the two hydrolysates to give a controlled pH of about 1.6, concentrating the resultant solution to between about 55 and about 90% of the initial weight of Steffen's filtrate, separating crystallized salts therefrom, adjusting the pH of the resultant solution to about 3.2, and recovering glutamic acid therefrom.

15. A process which comprises separately preparing an acid hydrolysate of Steffen's filtrate and an alkaline hydrolysate of Steffen's filtrate, separating humin from the acid hydrolysate, combining the two hydrolysates to give a controlled pH of about 1.6, concentrating the resultant combined hydrolysate to between about 55 and about 90% of the initial weight of Steffen's filtrate, separating crystallized salts therefrom, adjusting the pH of the resultant solution to about 3.2, and recovering glutamic acid therefrom.

16. A process which comprises separately preparing an acid hydrolysate of Steffen's filtrate and an alkaline hydrolysate of Steffen's filtrate, separating humin from the acid hydrolysate, combining the two hydrolysates to give a controlled pH of about 1.6, separating salts from the combined hydrolysate, concentrating the resultant solution to crystallize salts, separating said salts therefrom, adjusting the pH of the resultant solution to about 3.2, and recovering glutamic acid therefrom.

17. The process which comprises hydrolyzing Steffen's filtrate with a non-oxidizing mineral acid and separately hydrolyzing Steffen's filtrate with an inorganic alkaline compound, combining the two hydrolysates to give a controlled pH of about 1.6, separating humin from the combined hydrolysates, concentrating the resultant solution to crystallize salts, separating said salts therefrom, adjusting the pH of the resultant solution to about 3.2, and recovering glutamic acid therefrom.

18. The process which comprises hydrolyzing Steffen's filtrate with hydrochloric acid and separately hydrolyzing Steffen's filtrate with a caustic soda, combining the two hydrolysates to give a controlled pH of about 1.6, separating humin from the combined hydrolysates, concentrating the resultant solution to crystallize salts, separating said salts therefrom, adjusting the pH of the resultant solution to about 3.2 and recovering glutamic acid therefrom.

19. The process which comprises hydrolyzing Steffen's filtrate with hydrochloric acid, separating humin from the acid hydrolysate, separately hydrolyzing Steffen's filtrate with caustic soda, combining the acid hydrolysate with the alkaline hydrolysate to give a controlled pH of about 1.6, concentrating the resultant solution to crystallize salts, separating said salts therefrom, adjusting the pH of the resultant solution to about 3.2 and recovering glutamic acid therefrom.

20. The process which comprises hydrolyzing Steffen's filtrate with hydrochloric acid and separately hydrolyzing Steffen's filtrate with caustic soda, combining the two hydrolysates to give a controlled pH of about 1.6, separating humin from the combined hydrolysates, concentrating the resultant solution to crystallize salts, separating said salts therefrom, adjusting the pH of the resultant solution to about 3.2 with ammonia and recovering glutamic acid therefrom.

21. The process which comprises hydrolyzing Steffen's filtrate with hydrochloric acid, separating humin from the acid hydrolysate, separately hydrolyzing Steffen's filtrate with caustic soda, combining the acid hydrolysate with the alkaline hydrolysate to give a controlled pH of about 1.6, concentrating the resulting solution to crystallize salts, separating said salts therefrom, adjusting the pH of the resulting solution to about 3.2 with ammonia and recovering glutamic acid therefrom.

22. The process which comprises hydrolyzing Steffen's filtrate with about an equal weight of hydrochloric acid (about 36% HCl), separately hydrolyzing Steffen's filtrate with about 7.5% of caustic soda, combining the two hydrolysates to give a controlled pH of about 1.6, separating humin from the combined hydrolysates, concentrating the resultant solution to between about 55 and about 90% of the initial weight of Steffen's filtrate, crystallizing and separating salts therefrom at a temperature between about 40° C. and about 60° C., adjusting the pH of the resultant solution to about 3.2 with ammonia and separating glutamic acid therefrom.

23. The process which comprises hydrolyzing Steffen's filtrate with about an equal weight of hydrochloric acid (about 36% HCl), separating humin from the acid hydrolysate, separately hydrolyzing Steffen's filtrate with about 7.5% by weight of caustic soda, based on the weight of Steffen's filtrate, combining the two hydrolysates to give a controlled pH of about 1.6, concentrating the resultant solution to between about 55% and about 90% of the initial weight of the Steffen's filtrate, crystallizing and separating salts therefrom at a temperature between about 40° C. and about 60° C., adjusting the pH of the resultant solution to about 3.2 with ammonia and recovering glutamic acid therefrom.

ALBERT J. SCHLAEGER.
FOREST A. HOGLAN.

REFERENCES CITED

The following references are of record in the file of this patent:

UNITED STATES PATENTS

| Number | Name | Date |
|---|---|---|
| 1,940,428 | Masuda | Dec. 19, 1933 |
| 1,947,563 | Masuda et al. | Feb. 20, 1934 |
| 1,973,574 | Marshall | Sept. 11, 1934 |
| 2,405,223 | Manning | Aug. 6, 1943 |